United States Patent [19]

Jewell, II et al.

[11] Patent Number: 4,869,547

[45] Date of Patent: Sep. 26, 1989

[54] VEHICLE DOOR FLEX LIMITATION APPARATUS

[75] Inventors: John H. Jewell, II; Ross S. Sasamura, both of Fremont, Calif.

[73] Assignee: Paccar Inc., Bellevue, Wash.

[21] Appl. No.: 168,879

[22] Filed: Mar. 16, 1988

[51] Int. Cl.$^4$ ............................................. B60J 1/00
[52] U.S. Cl. ............................................. 296/201
[58] Field of Search ............... 296/75, 146, 152, 187, 296/188, 201, 202; 49/396, 502; 180/90.6, 89.12

[56] References Cited

U.S. PATENT DOCUMENTS 1,991,517  2/1935  Perry .................................. 296/202
3,370,384  2/1968  Hafer et al. ........................ 49/502
4,258,983  3/1981  Johnson ............................. 296/152

Primary Examiner—Joseph F. Peters, Jr.
Assistant Examiner—Jesús D. Sotelo
Attorney, Agent, or Firm—Flehr, Hohbach, Test, Albritton & Herbert

[57] ABSTRACT

A device for limiting the extent to which a vehicle door, hinge-mounted to the cab jamb along one side thereof for movement between a closed position and an open position within the surrounding jamb, will flex as a result of an individual hanging from or otherwise pulling downward on a mirror assembly externally mounted to said door.

7 Claims, 3 Drawing Sheets

VEHICLE DOOR FLEX LIMITATION APPARATUS

TECHNICAL FIELD

In general the present invention relates to improvements in vehicle doors and, more particularly to large truck doors having a rear or side view mirror assembly mounted to and extending from the door.

BACKGROUND OF THE INVENTION

Currently, when a driver or a passenger (collectively referred to as the driver) of a large truck, of the type typically used in the transport of goods across interstate highways, attempts to clean or service the truck cab windshield and surrounding area, he must have some help because the cab is so far above the ground. Most large trucks are equipped with several steps to assist the driver in gaining access to the cab. Unfortunately, the steps have not fully alleviated the problem of difficult access to the cab windshield area such that the driver often uses the bottom support bracket of the externally mounted mirror to help raise him into position thereby allowing him to gain access. In other words, persons are using the externally mounted mirror assembly to lift themselves up the side of the truck in an effort to obtain easier access to the cab and its windshield area.

Interestingly, the downward force placed upon the cab door's externally mounted mirror may cause the door itself to flex in an arcuate path outward at the top of the door and inward where the mirror is connected by a bracket to the cab door. Many complaints have been received that the door ultimately rattles and flexes due to the mirror assembly being pulled upon. In some severe cases, cracks have reportedly appeared on the door where the mirror assembly connects to the cab door.

Accordingly it is an object of the invention to provide an assembly which limits the extent to which a vehicle door will flex as a result of a downward force on an externally mounted mirror assembly or the like.

It is also an object of the invention to provide an assembly which will help maintain the structural integrity of a vehicle door exposed to repeated arcuate flexing due to a downward force being exerted upon the externally mounted mirror assembly.

It is a further object of the invention to provide an apparatus, consistent with the foregoing objects, which is durable, compact (in that it will not interfere with normal operation of the door), easy to install and maintain, and is economical to manufacture.

SUMMARY OF THE INVENTION

The vehicle door flex apparatus of the present invention includes means to limit the extent a vehicle door flexes downward and outward as a result of a downward force exerted upon the externally mounted rear or side view mirror assembly connected to the door. The flex limiting means comprise, briefly, a wear plate mounted onto or otherwise forming part of the top of the cab door jamb and a wedge mounted on a top, inner peripheral segment of the door which will engage said wedge when the truck door starts to flex outwardly and downwardly in an arcuate path.

DETAILED DESCRIPTION OF THE INVENTION

Figure 1:
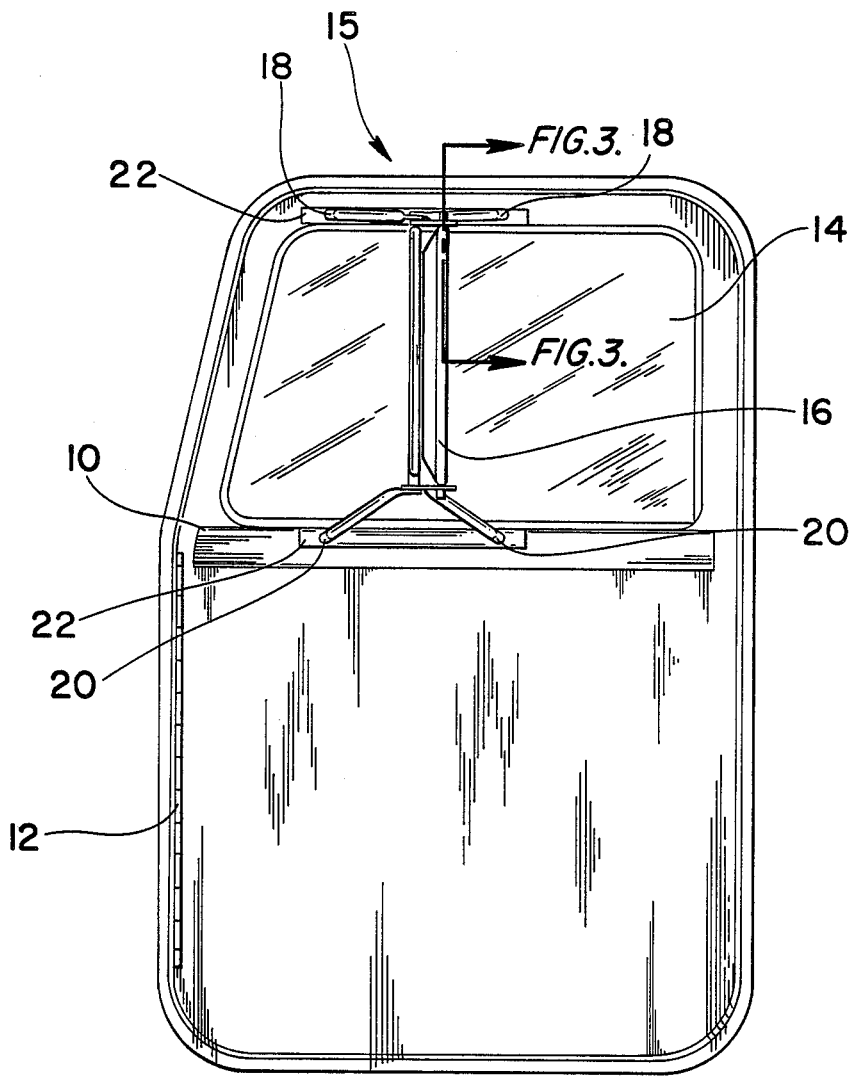
FIG. 1 is an external view of the cab door with the mirror assembly.

Turning now to the drawings, wherein like components are designated by like reference numerals throughout the various figures, attention is directed to FIG. 1 which illustrates a truck door 10, of the type often found in large trucks, including an elongated hinge 12 which connects the door to the cab door jamb 11 (the truck cab is not shown), and a window 14 through which the driver or other person may visually employ the rear or side view mirror 16. The mirror 16 is typically attached to the cab door 10 by way of 2 triangular brackets 18, 20 which attach to the door at several points 22. There may also be cross bars 24, 25 for added support, which are best shown in FIG. 2.

It should be noted that the exact location and type of brackets is in no way limiting to the benefits of the present invention. The present construction is simply meant to exemplify a typical bracket arrangement.

Figure 2:
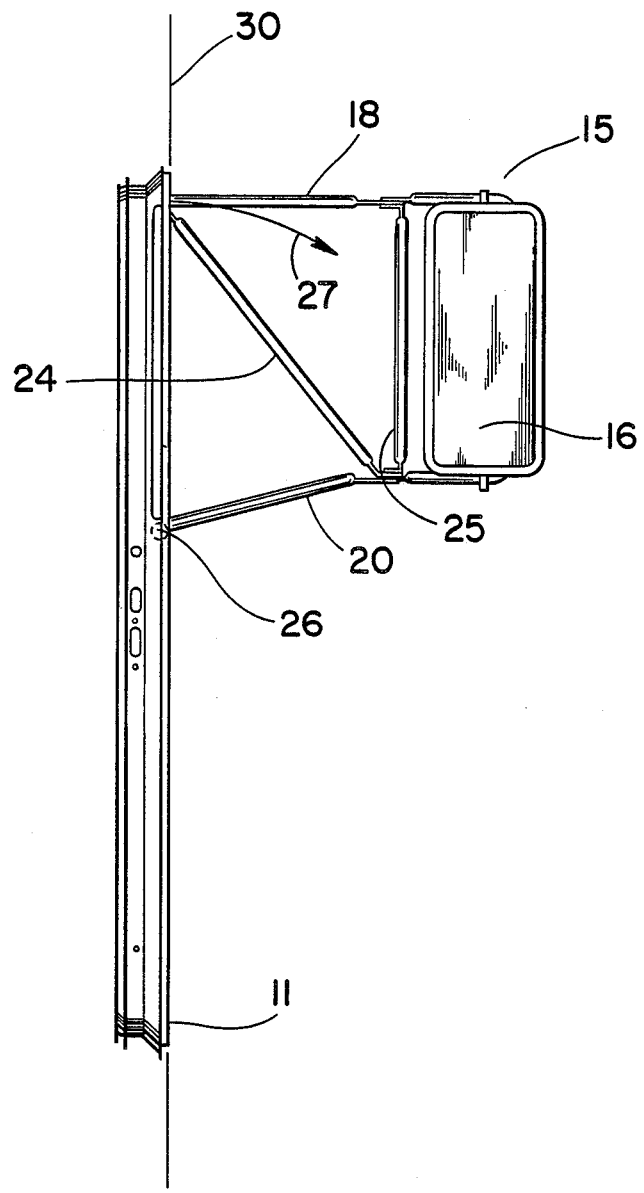
FIG. 2 shows a side view of the cab door shown in FIG. 1.

Turning to FIG. 2 attention is now directed to point 26 which represents the center of the moment of the arcuate rotation of cab door 10 when effected by a downward force on the mirror assembly 15 (which includes mirror 16, mounting brackets 18, 20 and cross bars 24,25). Specifically, when a downward force, such as the weight of a man pulling himself up by mirror assembly 15 is present, a moment is transferred to the upper frame of cab door 10. This moment and its direction are represented by arrow 27 in FIG. 2 with point 26 representing the moment's center.

Figure 3:
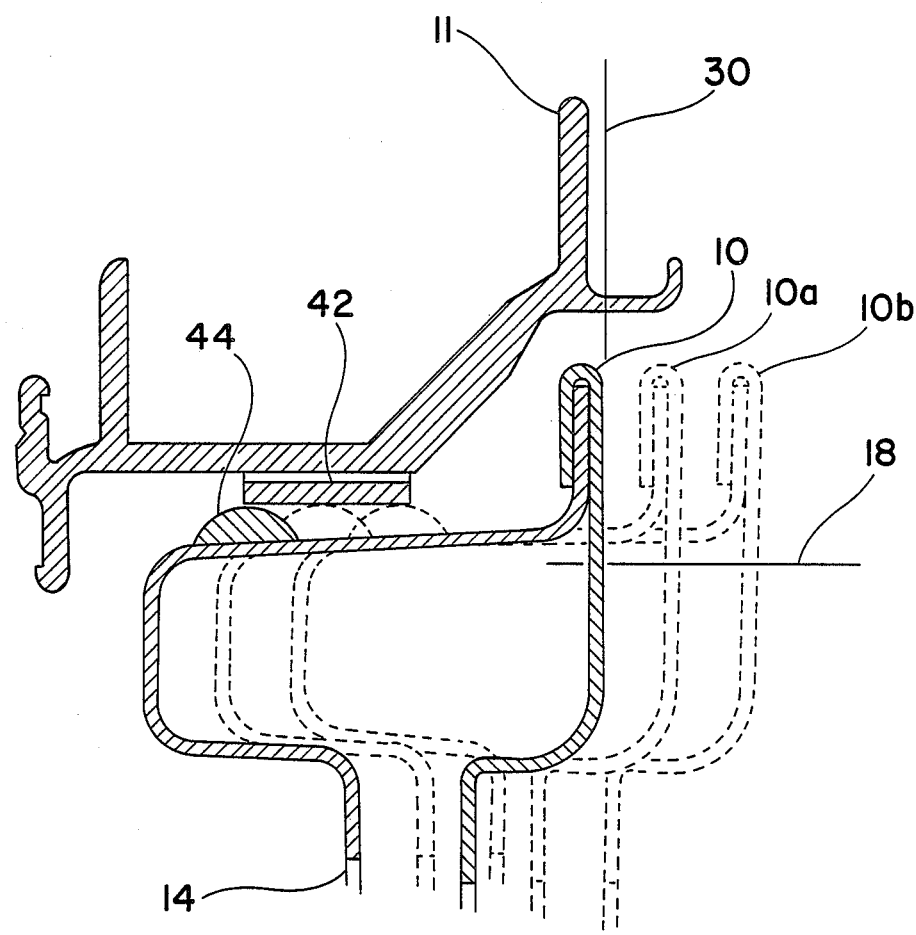
FIG. 3 shows a close up side view of the upper portion of the cab door in which the door's flexing movement is indicated by phantom lines 10(a) and 10(b).

Turning to FIG. 3 attention is directed to the structural details of the present invention as it is an enlarged side view of the top of cab door 10 where the present invention is employed. The top of cab door 10 fits inside door jamb 11 and the door and door jamb do not interfere with one another, when no force is being placed upon the mirror assembly, since the door's travel is substantially horizontal. The moment is also shown in FIG. 3 wherein when the cab door 10 is shown being deflected by a downward force being exerted upon the mirror assembly.

The door 10 follows an arcuate path indicated by additional door positions 10a, 10b (shown in phantom lines). As can be seen by door position 10b, if no means such as wear plate 42 were on the door jam to engage with the half sphere wedge 44 on the top of cab door 10 there would be no inhibition of the door's flexing moment. Since wedge 44 engages wear plate 42 in an effort to limit the flexing movement of door 10, the wedge needs to be of a material, such as metal or rubber, suitable to accomplish this purpose.

The exact dimensions of wear plate 42 and reinforcement wedge 44 are not dispositive as long as they do not interfere with each other when the door is open and closed without a downward force being applied to the mirror assembly. In fact wear plate 42 may be either a separate piece or an integral part of the door jamb 11. Yet they do interfere to inhibit rotation of door 10 if a downward force is being exerted on the mirror assembly.

For example, cab door position 10(a) shows the cab door sufficiently flexing such that wear plate 42 and wedge 44 make contact with each other and inhibit any further flexing of the door. Similarly, cab door position 10(b) shows an overlap between the wear plate 42 and wedge 44 signifying the amount of flexing movement of the door which will be inhibited.

It should be noted that wedge 44 is located on the top, innermost peripheral segment of door 10, inward from vertical plane 30, on which the center of rotational movement 26 is located. The flexing of door 10, in response to a downward force placed on mirror assembly 15, causes wedge 44 to travel along an arcuate path (indicated by arrow 27) with the rotational center occurring at 26. As wedge 44 travels in its arcuate path toward vertical plane 30, wedge 44 translates upward vertically relative to its initial, undeflected position. The geometric peak of vertical translation of wedge 44 occurs as the arcuate path of travel intersects vertical plane 30. However, wedge 44 will not travel to the geometric peak of vertical translation as wear plate 42 is positioned such that wedge 44 will make contact and prevent such gross deflections of door 10.

The foregoing has been a description of a preferred embodiment. It is to be understood that the exact configuration of the wear plate 42 and wedge 44 may vary in accordance with the present invention so long as they operate according to the parameters discussed above. Also while preferred it is not necessary to have two separate means such as 42 and 44. For example, it is possible to employ a single means on either the door 10 or jamb 11 which will operate according to the parameters discussed above.

What is claimed is:

1. In a truck or other such vehicle having a door, hinge mounted along one side thereof for movement between a closed position and an open position within a surrounding jamb, and a mirror assembly mounted to and extending out from said door such that if an individual hangs from or otherwise pulls downward on said mirror assembly, this downward force on the mirror assembly may cause the door itself to flex outward and downward according to an arcuate path, the improvement comprising:
    means for reducing the extent to which said door flexes in an arcuate path as a result of said downward force whereby the door is prevented from directly engaging the jamb.

2. The imrpovement according to claim 1 wherein said flex reducing means cooperates with said door so as to allow the door to move freely between its opened and closed position without any interference in the absence of said downward force.

3. In a truck or other such vehicle having a door, hinge mounted along one side thereof for movement between a closed position and an open position within a surrounding jamb, and a mirror assembly mounted to and extending out from said door such that if an individual hangs from or otherwise pulls downward on said mirror assembly, this downward force on the mirror assembly may cause the door itself to flex outward and downward according to an arcuate path, the improvement comprising:
    means for reducing the extent to which said door flexes in an arcuate path as a result of said downward force whereby the door is prevented from directly engaging the jamb;
    said flex reducing means cooperate with said door so as to allow the door to move freely between its open and closed position without any interference in the absence of said downward force; and
    wherein said flex reducing means include wedge means mounted on a top, inner peripheral segment of said door and cooperating means forming part of said jamb disposed above said wedge means such that, in the absence of said downward force on said mirror assembly, said wedge means remain in spaced apart relationship with said cooperating means, allowing the door to open and close without interference, and when said door starts to flex, in the presence of said downward force, it causes said wedge means to rise upward into engagement with said cooperating means, inhibiting said door from further flexing.

4. The improvement according to claim 3 wherein said cooperating means includes a wear plate on said jamb.

5. The improvement according to claim 4 wherein said wedge means includes a hemispherical shaped wedge.

6. The improvement according to claim 3 wherein said wedge means is located on the top innermost peripheral segment of said door supporting said mirror structure such that initial flexing of said door causes said wedge means to travel along an arcuate path.

7. In a truck or other such vehicle having a door, hinge mounted along one side thereof for movement between a closed position and an open position within a surrounding jamb, and a mirror assembly mounted to and extending out from said door such that if an individual hangs from or otherwise pulls downward on said mirror assembly, this downward force on the mirror assembly may cause the door itself to flex outward and downward according to an arcuate path, the improvement comprising:
    means separate from and located immediately between the door and jamb for reducing the extent to which said door flexes in an arcuate path as a result of said downward force whereby the door is prevented from directly engaging the jamb.

* * * * *